United States Patent [19]

Impink, Jr. et al.

[11] Patent Number: 5,271,052
[45] Date of Patent: Dec. 14, 1993

[54] ENRICHED BORON-10 BORIC ACID CONTROL SYSTEM FOR A NUCLEAR REACTOR PLANT

[75] Inventors: Albert J. Impink, Jr., Murrysville; Joseph A. Battaglia, Forest Hills; John W. Fasnacht, Greensburg; George G. Konopka, E. McKeesport, all of Pa.

[73] Assignee: Westinghouse Electric Corp., Pittsburgh, Pa.

[21] Appl. No.: 2,561

[22] Filed: Jan. 11, 1993

Related U.S. Application Data

[62] Division of Ser. No. 678,782, Apr. 1, 1991.

[51] Int. Cl.⁵ .............................................. G21C 7/00
[52] U.S. Cl. ..................................... 376/328; 376/219; 376/220
[58] Field of Search ........................ 376/328, 219, 220

[56] References Cited

U.S. PATENT DOCUMENTS

| | | | |
|---|---|---|---|
| 3,380,889 | 4/1968 | Loose | 376/219 |
| 3,666,626 | 5/1972 | Gramer et al. | 376/328 |
| 4,073,683 | 2/1978 | Van der Schoot | 376/328 |
| 4,225,390 | 9/1980 | Brown et al. | 376/328 |

Primary Examiner—Donald P. Walsh
Assistant Examiner—Frederick H. Voss
Attorney, Agent, or Firm—J. C. Valentine

[57] ABSTRACT

A nuclear reactor plant is provided in which the reactor coolant system contains a dissolved solution of enriched boric acid. The boron-10 to boron-11 atomic isotope ratio of the enriched boric acid solution is greater than 30:70 at the start of the reactor core cycle. The nuclear reactor plant design provides for minimal mixing between the reactor coolant solution containing the enriched boric acid solution and the natural boric acid solution used during refueling operations.

11 Claims, 2 Drawing Sheets

ENRICHED BORON-10 BORIC ACID CONTROL SYSTEM FOR A NUCLEAR REACTOR PLANT

This is a division of application Ser. No. 07/678,782 filed Apr. 1, 1991, currently pending.

TECHNICAL FIELD OF THE INVENTION

This invention pertains to a nuclear reactor control system which employs the use of an enriched boric acid solution in which the boron-10 isotope to boron-11 isotope ratio is greater than 19.8:80.2 as is found in naturally occurring boron acid solutions. This invention also pertains to operating a nuclear reactor plant utilizing an enriched boric acid solution for its primary reactor coolant solution during power operations and a natural boric acid solution for refueling functions in which the amount of make-up enriched boric acid solution needed for the reactor coolant system after refueling is minimized.

BACKGROUND OF THE INVENTION

A nuclear reactor must be provided with a system to control the reactor output. A number of ways of controlling the excess reactivity that is consciously designed into a nuclear power reactor core are known. These include the use of neutron absorbing control rods that can be inserted into or withdrawn from the reactor core, the adjustment of moderator temperature which changes the density and therefore both the fast neutron moderation and the thermal neutron absorption rates of the hydrogen in the light water coolant/moderator, and the use of solid and dissolved neutron absorbing poison materials incorporated either directly in the reactor core lattice (as burnable poison rods or fuel pellet coatings) or dissolved in the primary coolant/moderator as a "chemical shim". The chemical shim is commonly a boric acid solution. Systems employing such a boric acid solution for control of the nuclear reactor are discussed in Loose U.S. Pat. No. 3,380,889 and Gramer et al. U.S. Pat. No. 3,666,626. These coolant systems utilize natural boric acid solutions, which contain a maximum boron-10 (B-10) to boron-11 (B-11) atomic ratio of 19.8:80.2.

The prior art has refined processes for concentrating the natural boric acid solutions used as chemical shims in reactor coolant systems. This concentration is necessary due to the need for a highly concentrated solution of neutron capturing compounds at the start of the reactor cycle and to compensate for the loss of B-10 material (nuclei) during the reactor cycle, and to minimize waste water streams containing radioactive wastes. Van der Schoot U.S. Pat. No. 4,073,683 discloses an ion exchange system to reconcentrate a natural boric acid solution while also producing a dilute natural boric acid solution to control the reactivity in the reactor core. Brown et al. U.S. Pat. No. 4,225,390 discloses a joint ion exchange and evaporative system to control the reactivity of the reactor core wherein the chemical shim is also natural boric acid. U.S. Pat. No. 4,225,390 also discloses how to load follow the reactor using a natural boric acid solution. These processes deal with "concentrating" a solution of natural boric acid, that is, they raise or lower the amount of natural boric acid in a solution, but do not disclose how to operate a nuclear reactor which utilizes "enriched" boric acid as the primary reactor coolant. The term "enriched" refers to a boric acid solution in which the B-10 to B-11 atomic ratio is above the naturally occurring ratio of 19.8:80.2.

It is known that the B-10 isotope is the only isotope in boron-based poisons that contributes materially to the absorption of excess thermal or near thermal neutrons in reactor configurations. This is due to its relatively large neutron capture cross section in the thermal range. Also, it is known that the presence of any of the boron-based poison compounds in a typical power generating nuclear reactor leads to known deleterious effects, such as corrosion and wear, on other material components of the reactor core and of the associated nuclear steam supply system. Therefore, it follows that marked advantages over the prior art reactor coolant systems containing a chemical shim could be obtained if the B-10 to B-11 isotope ratio could be raised, thereby allowing a significant reduction in the total quantity of the boron-based poison material in the primary reactor coolant system at all times during power operations. Such a system would allow for the control of the nuclear reactor and also would be less deleterious on the physical components constituting the nuclear reactor.

SUMMARY OF THE INVENTION

The invention provides a pressurized water reactor coolant system (RCS) which differs from prior systems in that it contains a boric acid solution which is enriched in the boron-10 isotope to control the excess reactivity that is consciously designed into a nuclear power reactor core. This boric acid solution—referred to herein as EBA—is enriched in the boron-10 isotope and has a B-10 to B-11 atomic isotope ratio in excess of the natural ratio of 19.8:80.2. An EBA solution is preferred as a reactor coolant system solution since such a solution allows for a lower overall boric acid concentration in the reactor coolant system. This lower overall boric acid concentration means that a lower amount of lithium hydroxide is necessary to control the pH in the reactor coolant system. Such a reactor coolant system has a milder chemistry than those of the prior art and allows for a lower minimum temperature to be kept in the boric acid storage system. The lower concentration of the boric acid and the lithium hydroxide may lead to prolonged life for the components constituting the nuclear reactor coolant system.

Therefore it is an object of the present invention to provide an apparatus for controlling the excess reactivity of a nuclear reactor utilizing an EBA solution in the reactor coolant system during the power producing operation of the core cycle.

It is also an object of this invention to provide a process in which a nuclear reactor can be operated employing a reactor coolant system containing an EBA solution and minimizing the intermixing between the reactor coolant system and the refueling water system which contains a natural boric acid solution.

The inventive nuclear reactor control system comprises a nuclear reactor which has a primary reactor coolant solution circulating through the reactor core. The coolant solution is comprised of an isotopically enriched boron-10 boric acid, or EBA, solution. The EBA solution has a boron-10 to boron-11 atomic isotope ratio of greater than 19.8:80.2, and as great as 95:5 at the start of the reactor cycle.

The inventive control system employs a refueling water storage system containing a natural boric acid solution. This storage tank is connected to the reactor vessel and employed during a refueling operation.

The control system design of the present invention is operated during the normal power operation mode by diverting a quantity of the primary reactor coolant which is an EBA solution from the coolant system to a boron-10 storage system. When the reactivity of the reactor core diminishes, the boric acid concentration of the EBA solution is decreased and enriched boric acid is stored in the boron-10 storage system. At the end of the reactor core cycle the concentration of boron-10 in the coolant solution is near 0-10 ppm. Therefore, most of the boron-10 material is in the boron-10 storage system.

The inventive process for operating the EBA solution coolant system also provides that minimal mixing of the EBA solution and the refueling water solution will occur during and after refueling. During the refueling, the refueling water storage tank solution of natural boric acid—referred to herein as NBA—mixes with the reactor coolant solution (containing 0-10 ppm boron-10) in the reactor coolant system. After refueling, and when the fuel rods have been replaced, the vessel is closed. The boric acid solution in the reactor coolant system is then replaced with enriched boric acid. The invention provides for an apparatus and procedure to reduce the dilution of the EBA solution during this replacement step.

The replacement of the boric acid solution in the reactor coolant system with the enriched boric acid is accomplished in the following manner. The solution within the refueling canal is drained via the drain system to the refueling water storage tank. A portion of the solution still within the reactor vessel and the reactor coolant system is drained to a tank. The remaining solution in the reactor vessel and the reactor coolant system is displaced by the replacement EBA solution, preferably under plug flow conditions to minimize intermixing. The reactor is now in a condition to begin the next cycle.

A preferred method of minimizing the intermixing of the refueling water storage solution and the EBA solution is provided. Once the solution in the refueling canal is transferred via the drain system to the refueling water storage tank, then a portion of the remaining solution in the vessel is drained to the reactor hold-up tank by means of the residual heat removal system (RHR system). This RHR system is connected to the reactor coolant loop which connects the reactor vessel to the steam generation system. After an amount of the reactor coolant is drained from the reactor coolant system via the RHR system, and most preferably to a level such that the minimum amount of coolant is left in the reactor vessel to maintain core cooling and shutdown margin, displacement may begin. The displacement with the EBA solution is preferably carried out by employing the RHR system piping to both direct the incoming EBA solution and the outgoing remaining vessel coolant solution. The displacement can be monitored by use of temperature sensitive devices since the temperature of the incoming EBA solution is significantly cooler than the exiting vessel solution. Monitoring may also be accomplished by a B-10 isotope analyzer.

The EBA solution for displacing the solution in the reactor vessel following refueling can be supplied by directing a heated solution through the ion exchange resins or by utilizing the concentrated EBA solution from the evaporative system. A make-up supply of EBA solution can be supplied to the reactor coolant system to compensate for EBA dilution during this displacement process.

DESCRIPTION OF PREFERRED EMBODIMENT

The present inventive system may be employed in any nuclear reactor design which utilizes a boron based chemical shim to control the reactor output. The preferred nuclear reactor system is designed upon a pressurized water nuclear reactor plant configuration since these plant configurations are more apt to employ a soluble neutron capturing material dissolved in the control fluid.

Figure 1:
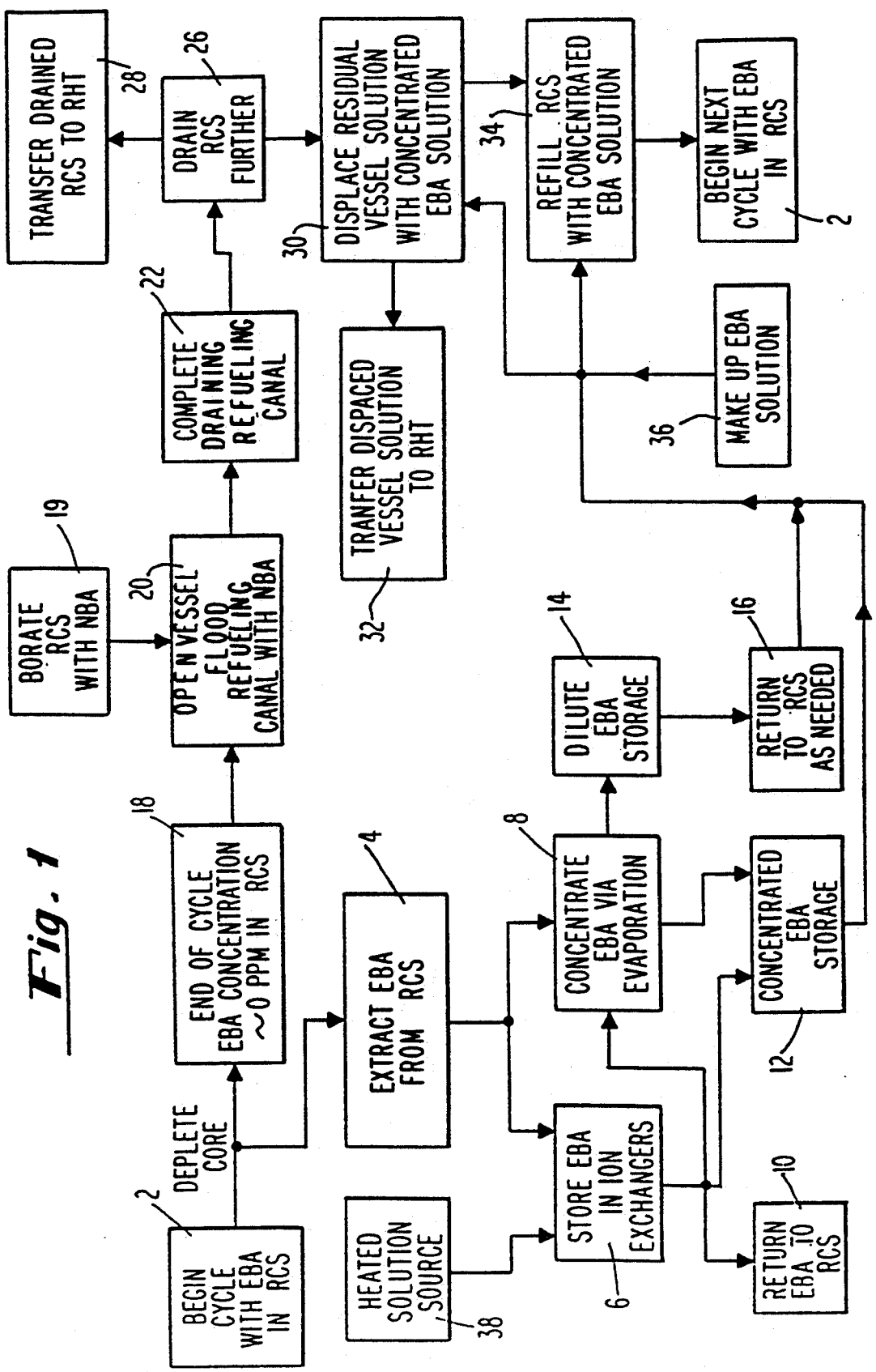
FIG. 1 shows a process flow diagram which portrays in block format the process steps employed in the operation of a pressurized water nuclear reactor utilizing the present invention.

Referring to the nuclear reactor plant flow diagram shown in FIG. 1, the process steps for operating a pressurized water reactor utilizing enriched B-10 in the reactor coolant system (RCS) are disclosed. The reactor coolant system consists of the equipment necessary to transport the coolant to and from the reactor core as is known in the art. To the far left of the flow diagram, in block 2, the process starts with a new reactor cycle. The new cycle is characterized by having supplied the reactor vessel with new fuel rods. At this stage, the necessary level of the B-10 boron isotope is found in the reactor coolant system. This B-10 boron level must be high enough to control the output from the new fuel rods once the nuclear reaction is allowed to proceed. The reactor coolant system is said to contain an enriched B-10 boric acid solution in that the ratio of the B-10 boron isotope to the B-11 boron isotope is greater than that of naturally occurring boric acid solutions in which the maximum B-10:B-11 isotope ratio is no greater than 19.8:80.2. The reactor coolant system may also contain other neutron capturing materials, however the preferred reactor coolant system would only contain the EBA solution as the neutron capturing material.

Once the nuclear reaction is allowed to proceed, the reactor coolant system solution is circulated through the reactor vessel to control the reaction and also to transfer heat energy to the steam generation system (not shown in diagram). After the reactor fuel begins to be depleted of fissionable material, the level of neutron capturing material in the reactor coolant system solution is decreased so that the maximum output of controllable energy is obtained from the reactor. A reactor coolant system storage loop is provided which is employed to control the concentration of B-10 boron material in the reactor coolant solution. As shown in block 4, a portion of the coolant solution, containing the EBA solution, which is circulating through the reactor vessel is extracted from the coolant system.

The extracted EBA solution is selectively directed to either a storage system or a concentration system. As shown in block 6, the EBA (more importantly, the B-10 material or molecules) is preferably stored in ion exchange beds. The ion exchange beds contain an amount of basic anion exchange resin material which can either store the EBA solution or release the EBA solution based upon the temperature of the incoming EBA stream. Thus, the EBA solution can be, in effect, "banked" as the cycle progresses and excess core reactivity decreases. Alternatively, the extracted EBA solution can be directed to the concentration system as shown in block 8. The preferred concentration system is an evaporation system. The extracted EBA solution can be reconcentrated by use of the evaporation system and stored for later use when a reconcentrated EBA solution is required by the reactor system.

Both the ion exchange system and the evaporation system can be arranged to return a controlled amount of the EBA solution back to the reactor coolant solution circulating through the reactor vessel. The returned coolant solution may be concentrated to any desired level of B-10 boric acid however the level of B-10:B-11 enrichment is not increased. The solution exiting the ion exchange beds, block 6, may be returned to the reactor coolant system as shown in block 10, or it may be directed towards the evaporation system in block 8 to be concentrated. The ion exchange beds can also release a high concentration EBA solution if a heated solution, preferably between 70°-150° F., and preferably either water or an EBA solution, is supplied via block 38 to the ion exchanger system, block 6. The upper temperature limit for eluting an enriched boric acid solution from the ion exchange resins is limited by the resin utilized. This concentrated EBA solution can be directed towards a concentrated EBA storage system, shown in block 12. The evaporative system in block 8 can supply a concentrated EBA solution to the concentrated EBA storage system, block 12, or a dilute EBA solution to the dilute EBA storage system shown in block 14. The solutions produced in the concentration system can be circulated back to the reactor coolant system as shown in block 16.

When some of the reactor fuel rods are nearly depleted of their fissionable matter, the reactive core cycle is concluded. At this point the level of the B-10 isotope in the reactor coolant which is circulating through the reactor vessel is close to 0-10 ppm. All of the B-10 material at this point has either been stored, or "banked", in the ion exchange resin beds or in the concentrated EBA storage facility or have been lost due to reaction with a neutron particle. The concentration of the depleted reactor coolant solution is shown in block 18.

Once the reactor has reached the end of its cycle, some of the reactor fuel rods must be replaced. First, the reactor coolant system is "borated" as shown in block 19. This step is accomplished by a "feed and bleed" procedure in which an NBA solution is fed into the reactor coolant and the depleted reactor coolant in the reactor coolant system is removed. Next, the reactor coolant system is drained to the reactor flange level. The reactor vessel head is now removed and the refueling canal and reactor vessel cavity are flooded with an NBA solution from the refueling water storage tank, as shown in block 20. Once refueling has taken place, an amount of the refueling solution is transferred via the drain system back to the refueling water storage tank and the reactor head is replaced, as is shown in block 22.

The solution now residing in the reactor coolant system (including the reactor vessel) must be displaced, preferably to the greatest extent possible, before introducing the EBA solution necessary to control the nuclear reaction of the next cycle. A portion of the solution in the reactor coolant system is sent to the refueling water storage tank or preferably to the reactor hold-up tanks. This step is shown in the figure as block 26 and 28.

The lowest level of drainage will depend upon safety factors to ensure that the reactor core is at all times properly cooled and controlled. The solution transferred to the reactor hold-up tank can also be further processed to reconcentrate the natural boric acid. The next step in the process is to displace the residual solution in the reactor coolant system and the vessel with the EBA solution to be used in the reactor coolant system, as is shown in block 30. Upon displacement, the solution exiting the reactor coolant system (and vessel) is directed to the reactor hold-up tank, as is shown in block 32.

The EBA solution which is used to displace the residual natural boric acid solution remaining in the reactor coolant system can be supplied by various systems within the reactor plant. First, the EBA solution can be obtained from the concentrated EBA storage system, block 12. An alternative source of the EBA solution is to use the EBA make-up system as is shown in block 36. This EBA make-up system is merely a combination of processing units which can supply a highly concentrated enriched boric acid solution.

The entire reactor coolant system is then refilled with a solution of EBA, block 34, using the same EBA sources as for the displacement of the refueling NBA solution. The beginning of the next cycle can proceed as is shown in block 2. The boron-10 to boron-11 isotope ratio in the reactor coolant system may vary from greater than 19.8:80.2 to 95:5 at the start of a reactor cycle.

A relatively small amount of make-up EBA will have to be introduced to the reactor coolant system during the reactor cycles. This is due to the fact that the B-10 nuclei reacts during the reactor cycle with neutrons and also since not all of the reactor coolant solution can be drained during refueling and therefore some dilution of the EBA solution in the reactor coolant system occurs when the refueling takes place. Therefore, an EBA make-up supply is necessary as is shown in block 36.

Figure 2:
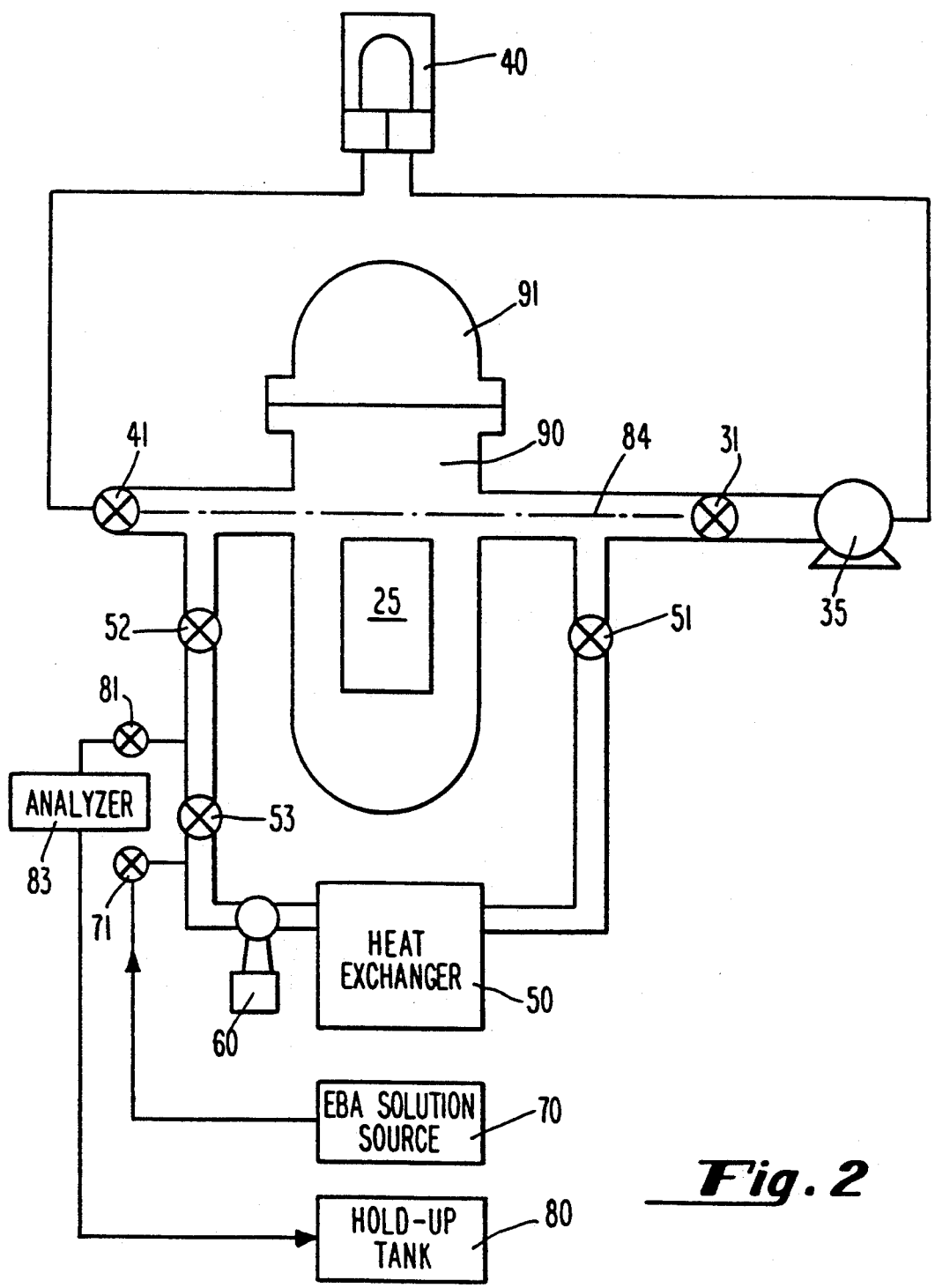
FIG. 2 is a process flow diagram depicting a representative plant configuration to be used to replace a natural boric acid solution in the reactor coolant system with an enriched boric acid solution.

In order to more fully describe the steps of the preferred method of displacing the remaining refueling NBA solution in the reactor coolant system by an EBA solution, and minimizing the intermixing of the two solutions, reference is made to FIG. 2. A reactor vessel 90 and reactor vessel head 91 containing a reactor core 25 is shown with the reactor vessel 90 containing a minimum level of solution to control the reaction, shown representatively as fluid level 84. This stage of refueling corresponds to block 26 in FIG. 1. Optional loop stop valves 31, 41 are shown downstream of the reactor coolant system pump 35 and upstream from the steam generation system 40.

Prior to the EBA solution switch over, the reactor core temperature is maintained by circulating the solution of NBA within the reactor vessel 90 by residual heat exchanger pump 60 through the residual heat exchanger 50. The valves 51, 52 are open to allow the NBA solution to flow through this residual heat exchange loop. Optional loop stop valves 31, 41 would be closed if the particular plant design incorporated these valves. The EBA refueling valve 53 is open during this NBA core cooling operation. The process step of draining the reactor vessel 90 to its minimum level prior to displacement with the EBA solution, as shown in FIG. 1 by block 26 and 28, is preferably accomplished by opening the reactor hold-up tank value 81 and draining a portion of the solution in the reactor vessel 90 to the reactor hold-up tank 80.

In order to displace the NBA refueling solution with an EBA solution, the EBA solution source valve 71 and the reactor hold-up tank valve 81 are opened, and the EBA refueling valve 53 is closed. This diverts the solution exiting the reactor vessel 90 to the reactor hold-up tank 80 while the incoming EBA solution from the EBA solution source 70 fills the reactor vessel 90. The EBA solution source 70 can be flow coupled to either the ion exchange system, the evaporation system, the concentrated EBA storage system, or to the EBA make-up system, however, it is preferred to connect to the concentrated EBA storage system. By employing the use of loop stop valves 31, 41 the amount of NBA solution which enters the reactor coolant system is kept to a minimum. When the EBA solution has displaced the NBA refueling solution the EBA solution source valve 71 and the reactor hold-up tank valve 81 are closed. Normal operating procedures are now followed to bring the reactor back on line for power production. Eventually, when the reactor is prepared to be put back in the power production mode, the RHR system can be shutdown until needed. The valves 51, 52 are closed. Valve 53 may optionally be reopened. The residual heat exchange pump 60 is shut down. If loop stop valves 31, 41 are utilized, they are opened again at this time. The residual heat removal system is thus shut down until needed. Only one residual heat removal loop is shown in FIG. 2, however it is known in the art to supply a plurality of such residual heat removal loops and the present invention can be employed with each residual heat removal loop.

The displacement of the NBA refueling solution in the reactor vessel 90 by the EBA replacement solution can be monitored by two methods. First, if the incoming EBA replacement solution is at a different temperature than the NBA refueling solution, the displacement is discontinued when the exiting temperature of the solution directed towards the reactor hold-up tank 80 is approximately that of the replacement EBA solution. The displacement could be discontinued when the temperature difference between the exiting solution and the EBA solution is some predetermined value. Preferably, the temperature difference between the two solutions is maximized to enhance this processing step. Also the boron-10 enrichment of the exiting solution can be monitored and displacement is discontinued when the boron-10 enrichment of the solution directed towards the reactor hold-up tank 80 approaches the level of the replacement EBA solution. The temperature or boron-10 enrichment level are monitored by the analyzer 83. If the temperature is analyzed, analyzer 83 is a temperature sensor. If the boron-10 enrichment level is analyzed, the analyzer 83 is a mass spectrometer. Optionally, both detection systems could be utilized as a design alternative. The temperature and the B-10 enrichment level of the replacement enriched boric acid solution is determined by a similar analyzer device which is not shown.

The intermixing of the EBA replacement solution and the NBA refueling solution is dependent upon the plug flow displacement process. The approximate percentage of the NBA solution that would intermix with the EBA solution and be present in the reactor coolant solution after displacement without the use of loop stop valves 31, 41 is approximately about 30%. That is, 30% of the final reactor coolant system volume would be comprised of the NBA solution from the refueling step and about 70% would be the replacement EBA solution. Employing the use of loop stop valves 31, 41 would lead to an after refueling volume of NBA in the reactor coolant system of approximately 10% with remaining 90% being the EBA solution.

The operation of a nuclear reactor with an EBA solution in the reactor coolant system allows for maintaining a milder chemistry within the reactor coolant system. The prior art method of reactor operation with a NBA solution required a higher boric acid concentration and therefore a higher concentration of lithium hydroxide for pH balancing purposes. The EBA process of the present invention allows for the same effective B-10 concentration in the reactor coolant with its accompanying control capacity, while decreasing the total boric acid concentration required to supply that level of the B-10 isotope. Due to the higher expense of an EBA solution as opposed to an NBA solution, the present invention provides for procedures which minimize the mixing between the EBA solution in the primary reactor coolant system and the NBA solution in the other boric acid systems. This allows for the operation of the nuclear reactor plant using the EBA solution and therefore taking advantage of the associated benefits while minimizing the added incremental costs of such an operation.

We claim:

1. A nuclear reactor control system comprising a nuclear reactor vessel having a coolant solution circulating through said reactor vessel, said coolant solution being comprised of an isotopically enriched boron-10 boric acid solution, said boric acid solution containing a boron-10 to boron-11 atomic isotope ratio of at least 30%.

2. The nuclear reactor control system of claim 1, wherein the control system further comprises:
   (a) a reactor coolant system which contains said coolant solution, said coolant system connected to said reactor vessel;
   (b) a refueling water storage tank, said refueling water storage tank containing a natural boric acid solution;
   (c) conduit means for connecting said refueling water storage tank to said reactor vessel.

3. The control system of claim 2, wherein said isotopically enriched boron-10 boric acid solution has a boron-10 to boron-11 isotope ratio of up to 95:5, at the start of the reactor cycle.

4. The control system of claim 2, wherein said isotopically enriched boron-10 boric acid solution has a boron-10 to boron-11 isotope ratio which is about 75:25 at the start of the reactor cycle.

5. The control system of claim 3, wherein said nuclear reactor is a pressurized water nuclear reactor.

6. The control system of claim 5 which includes a make-up system containing an enriched boric acid solution, flow coupled to said reactor coolant system.

7. The control system of claim 6, which includes a boron-10 storage system flow coupled to said reactor coolant system and a concentration system flow coupled to said boron-10 storage system.

8. The control system of claim 7, wherein said boron-10 storage system is an ion exchange system and said concentration system is an evaporation system.

9. The control system of claim 7 which includes a residual heat removal system flow coupled to said coolant system;
- a refueling inlet line connecting at least one of the group consisting of the concentration system, the boron-10 storage system, and the make-up system to said residual heat removal system;
- a refueling outlet line connected to said residual heat removal system upstream from said refueling outlet line and an isolation valve located between the refueling outlet line and the refueling inlet line.

10. The control system of claim 9 which includes an analyzer to monitor the temperature of the solution in said refueling outlet line.

11. The control system of claim 9 which includes an analyzer to monitor the boron-10 enrichment of the solution in said refueling outlet line.

* * * * *